(12) United States Patent
Gong et al.

(10) Patent No.: US 7,472,913 B2
(45) Date of Patent: Jan. 6, 2009

(54) DRILL CHUCK

(75) Inventors: Bach Gong, Suzhou (CN); J. Larry Wilson, Belton, SC (US)

(73) Assignee: Jacobs Chuck Manufacturing Company, Clemson, SC (US)

( * ) Notice: Subject to any disclaimer, the term of this patent is extended or adjusted under 35 U.S.C. 154(b) by 356 days.

(21) Appl. No.: 11/148,582

(22) Filed: Jun. 9, 2005

(65) Prior Publication Data

US 2006/0279048 A1    Dec. 14, 2006

(51) Int. Cl.
B23B 31/163    (2006.01)

(52) U.S. Cl. .................... 279/62; 279/140; 279/902

(58) Field of Classification Search .............. 279/62, 279/140, 60, 61, 902; B23B 31/163
See application file for complete search history.

(56) References Cited

U.S. PATENT DOCUMENTS

| | | | |
|---|---|---|---|
| 573,189 A | 12/1896 | Vogel | 279/62 |
| 4,395,170 A | 7/1983 | Clarey | 408/241 |
| 4,498,682 A | 2/1985 | Glore | 279/81 |
| 5,044,643 A | 9/1991 | Nakamura | 279/60 |
| 5,125,673 A | 6/1992 | Huff et al. | 279/60 |
| 5,145,192 A | 9/1992 | Rohm | 279/62 |
| 5,145,193 A | 9/1992 | Rohm | 279/62 |
| 5,172,923 A | 12/1992 | Nakamura | 279/62 |
| 5,232,230 A | 8/1993 | Lin | 279/62 |
| 5,234,223 A | 8/1993 | Sakamaki | 279/61 |
| 5,253,879 A | 10/1993 | Huff et al. | 279/62 |
| 5,286,041 A | 2/1994 | Rohm | 279/62 |
| 5,348,317 A | 9/1994 | Steadings et al. | 279/62 |
| 5,431,419 A | 7/1995 | Mack | 279/62 |
| 5,458,345 A | 10/1995 | Amyot | 279/62 |
| 5,499,829 A | 3/1996 | Rohm | 279/62 |
| 5,499,830 A | 3/1996 | Schnizler | 279/62 |
| 5,501,473 A | 3/1996 | Barton et al. | 279/62 |
| 5,580,197 A | 12/1996 | Rohm | 408/240 |
| 5,590,985 A | 1/1997 | Mack | 408/56 |
| 5,615,899 A | 4/1997 | Sakamaki | 279/62 |
| 5,624,125 A | 4/1997 | Rohm | 279/62 |
| 5,741,016 A | 4/1998 | Barton et al. | 279/62 |
| 5,765,839 A | 6/1998 | Rohm | 279/62 |
| 5,816,582 A | 10/1998 | Steadings et al. | 279/62 |

(Continued)

FOREIGN PATENT DOCUMENTS

EP    1 498 201    1/2005

(Continued)

*Primary Examiner*—David P. Bryant
*Assistant Examiner*—Eric A Gates
(74) *Attorney, Agent, or Firm*—Nelson Mullins Riley & Scarborough, LLP

(57) ABSTRACT

A chuck with a generally cylindrical body having a tail section configured to receive a drive shaft of a driver and a nose section having an axial bore formed therein. A plurality of jaws is movably disposed with respect to the body. A nut is rotatably mounted about the body and operatively engages the jaws. A sleeve is non-rotatably coupled to the nut. A shield cap is rotatably secured about the nose section of the body. The chuck also includes a first ring and a second ring that rotates relative to the nut over a limited arc. One of the first ring and the second ring defines a ratchet and the other defines at least one deflectable tab that is biased toward and engages the ratchet.

24 Claims, 5 Drawing Sheets

U.S. PATENT DOCUMENTS

| | | | |
|---|---|---|---|
| 5,816,583 A | 10/1998 | Middleton | 279/62 |
| 5,829,761 A | 11/1998 | Rohm | 279/62 |
| 5,957,469 A | 9/1999 | Miles et al. | 279/62 |
| 5,988,958 A | 11/1999 | Mack | 408/240 |
| 5,992,859 A | 11/1999 | Lin | 279/62 |
| 6,010,135 A * | 1/2000 | Miles et al. | 279/62 |
| 6,017,039 A * | 1/2000 | Gaddis et al. | 279/62 |
| 6,070,884 A | 6/2000 | Mack | 279/62 |
| 6,095,530 A | 8/2000 | Rohm | 279/62 |
| 6,129,363 A | 10/2000 | Mack | 279/62 |
| 6,260,856 B1 | 7/2001 | Temple-Wilson | 279/62 |
| 6,341,783 B1 | 1/2002 | Rohm | 279/62 |
| 6,390,481 B1 * | 5/2002 | Nakamuro | 279/62 |
| 6,550,785 B2 | 4/2003 | Rohm | 279/62 |
| 6,575,478 B2 | 6/2003 | Rohm et al. | 279/62 |
| 6,581,942 B2 | 6/2003 | Rohm | 279/62 |
| 6,848,691 B2 | 2/2005 | Yang et al. | 279/62 |
| 6,860,488 B2 | 3/2005 | Mack | 279/62 |
| 7,125,021 B2 * | 10/2006 | Tan | 279/62 |
| 7,128,324 B2 * | 10/2006 | Yang et al. | 279/62 |
| 7,249,770 B2 * | 7/2007 | Yang et al. | 279/62 |
| 2003/0026670 A1 * | 2/2003 | Temple-Wilson | 408/240 |
| 2004/0217558 A1 * | 11/2004 | Yang et al. | 279/62 |
| 2005/0242531 A1 * | 11/2005 | Young | 279/62 |
| 2005/0258605 A1 | 11/2005 | Tan | 279/62 |
| 2006/0232023 A1 * | 10/2006 | Yaksich | 279/62 |
| 2007/0052182 A1 * | 3/2007 | Bordeianu | 279/62 |

FOREIGN PATENT DOCUMENTS

| | | |
|---|---|---|
| GB | 2 294 220 | 4/1996 |
| GB | 2 356 367 | 5/2001 |
| WO | WO 98/14294 | 4/1998 |
| WO | WO 02/100583 | 12/2002 |

* cited by examiner

DRILL CHUCK

FIELD OF THE INVENTION

The present disclosure relates generally to chucks for use with drills or with electric or pneumatic power drivers. More particularly, the present disclosure relates to a chuck of the keyless type which may be tightened or loosened by hand or actuation of the driver motor.

BACKGROUND OF THE INVENTION

Hand, electric and pneumatic tool drivers are well known. Although twist drills are the most common tools on such drivers, the tools may also comprise screw drivers, nut drivers, burrs, mounted grinding stones, and other cutting or abrading tools. Since the tool shanks may be of varying diameter or of polygonal cross section, the device is usually provided with a chuck adjustable over a relatively wide range. The chuck may be attached to the driver by a threaded or tapered bore.

A variety of chucks have been developed in the art. In an oblique jawed chuck, a chuck body includes three passageways disposed approximately 120 degrees apart from each other. The passageways are configured so that their center lines meet at a point along the chuck axis forward of the chuck. The passageways constrain three jaws that are movable in the passageways to grip a cylindrical or polygonal tool shank displaced approximately along the chuck center axis. The chuck includes a nut that rotates about the chuck center and that engages threads on the jaws so that rotation of the nut moves the jaws in either direction within the passageways. The body is attached to the drive shaft of a driver and is configured so that rotation of the body in one direction with respect to the nut forces the jaws into gripping relationship with the tool shank, while rotation in the opposite direction releases the gripping relationship. The chuck may be keyless if it is rotated by hand. Various configurations of keyless chucks are known in the art and are desirable for a variety of applications.

SUMMARY OF THE INVENTION

The present disclosure recognizes and addresses considerations of prior art constructions and methods. In one embodiment of the present chuck for use with a driver having a drive shaft, the chuck includes a generally cylindrical body having a nose section and a tail section, the tail section being configured to receive the drive shaft of the driver and the nose section having an axial bore formed therein. A plurality of jaws are movably disposed with respect to the body and in communication with the axial bore. A nut is rotatably mounted about the body and is in driving engagement with the jaws so that rotation of the nut in a closing direction moves the jaws toward the axis of the axial bore and rotation of the nut in an opening direction moves the jaws away from the axis. A shield cap is rotatably secured about the nose section of the body. The chuck also includes a first ring and a second ring, the second ring rotating relative to the nut over a limited arc. One of the first ring and the second ring defines a ratchet and the other of the first ring and the second ring defines at least one deflectable tab that is biased toward and engages the ratchet.

In another embodiment, a chuck for use with a driver having a drive shaft has a generally cylindrical body having a nose section and a tail section, the tail section being configured to rotate with the drive shaft of the driver and the nose section having an axial bore formed therein. A plurality of jaws are movably disposed with respect to the body and in communication with the axial bore, the jaws defining a tool engaging surface on one side thereof and threads on an opposite side. A nut is rotationally mounted on the body and defines threads on an inner circumference thereof, the nut being in threaded engagement with the jaws such that rotation of the nut causes the jaws to move with respect to the body. A generally cylindrical sleeve is rotatably mounted about the body and in driving engagement with the nut so that rotation of the sleeve in a closing direction moves the jaws toward the axial bore and rotation of the first sleeve in an opening direction moves the jaws away from the axial bore. The chuck also includes a planar first ring defining a plurality of teeth formed thereon and a second ring that is rotatable relative to the nut over a limited arc and that defines at least one pawl thereon, the at least one pawl being biased toward the plurality of teeth. When the chuck is in a first state, the planar first ring and the second ring are rotationally coupled to each other in both the opening and closing directions, and when the chuck is in a second state in which the jaws clamp onto the shank of the tool, the second ring is rotatable relative to the planar first ring in the closing direction causing an audible click, but is non-rotatably fixed to the first ring in the opening direction.

The accompanying drawings, which are incorporated in and constitute a part of this specification, illustrate one or more embodiments of the drill chuck and, together with the description, serve to explain the principles of the drill chuck.

BRIEF DESCRIPTION OF THE DRAWINGS

A full and enabling disclosure of the present drill chuck, including the best mode thereof, directed to one of ordinary skill in the art, is set forth in the specification, which makes reference to the appended drawings, in which.

Figure 1:
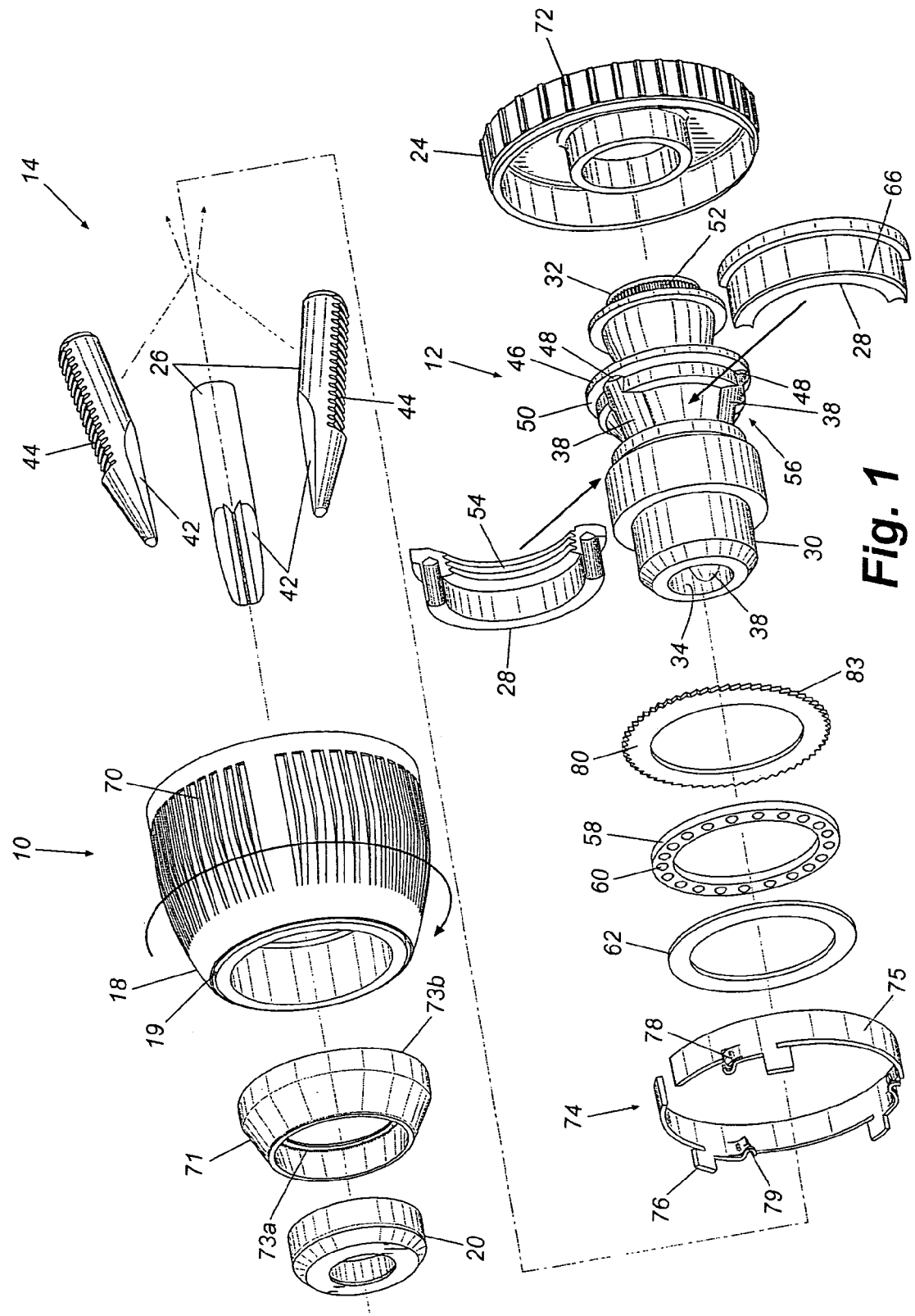
FIG. 1 is an exploded view of a chuck in accordance with an embodiment of the present disclosure.

Repeat use of reference characters in the present specification and drawings is intended to represent same or analogous features or elements of the drill chuck according to the disclosure.

DETAILED DESCRIPTION OF THE PREFERRED EMBODIMENTS

Reference will now be made in detail to presently preferred embodiments of the drill chuck, one or more examples of which are illustrated in the accompanying drawings. Each example is provided by way of explanation, not limitation, of the drill chuck. In fact, it will be apparent to those skilled in the art that modifications and variations can be made in the present drill chuck without departing from the scope and spirit thereof. For instance, features illustrated or described as part of one embodiment may be used on another embodiment to yield a still further embodiment. Thus, it is intended that the present disclosure covers such modifications and variations as come within the scope of the appended claims and their equivalents.

Figure 2:
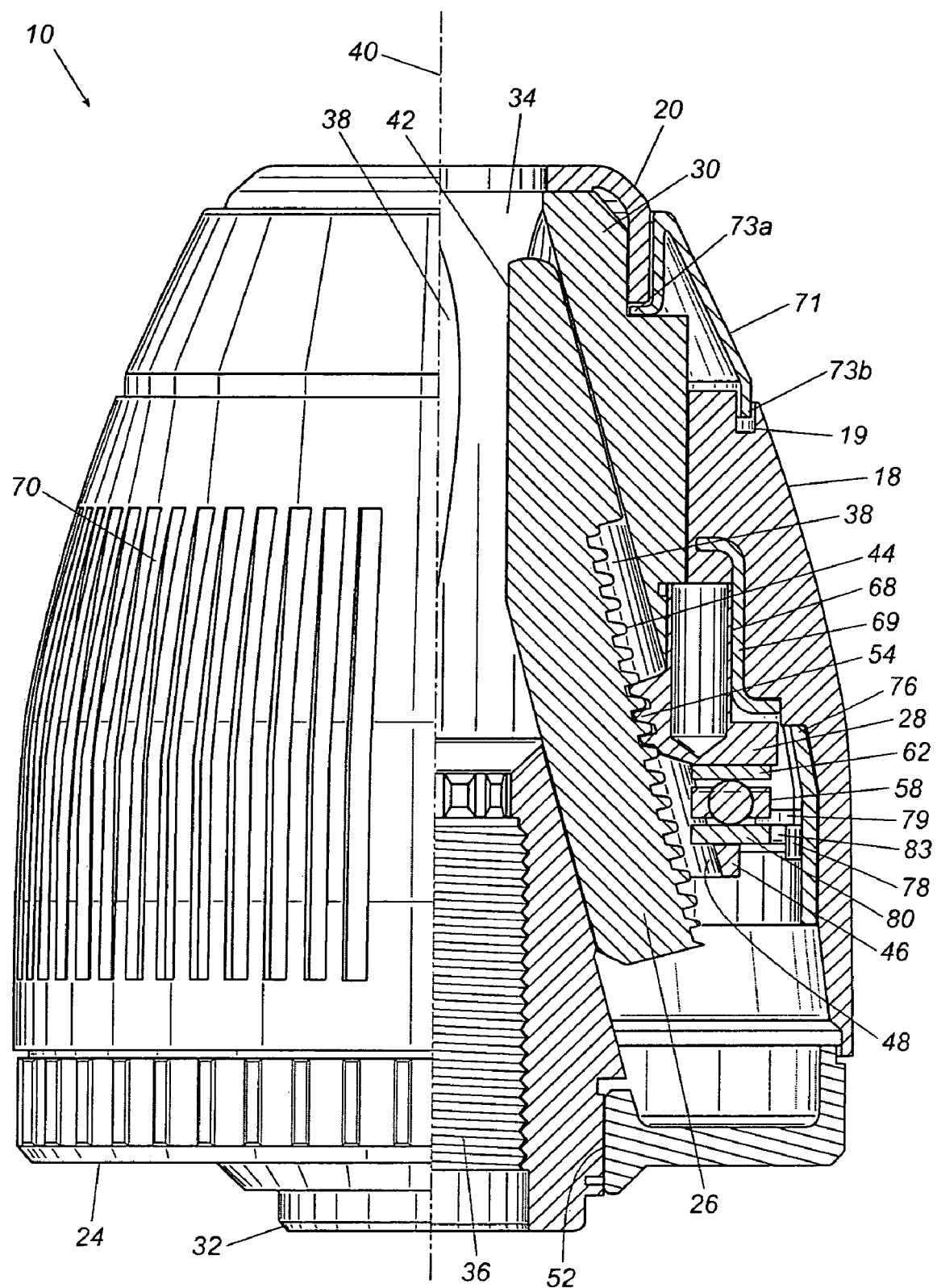
FIG. 2 is a longitudinal view, in partial cross section, of the chuck shown in FIG. 1.
Figure 3:
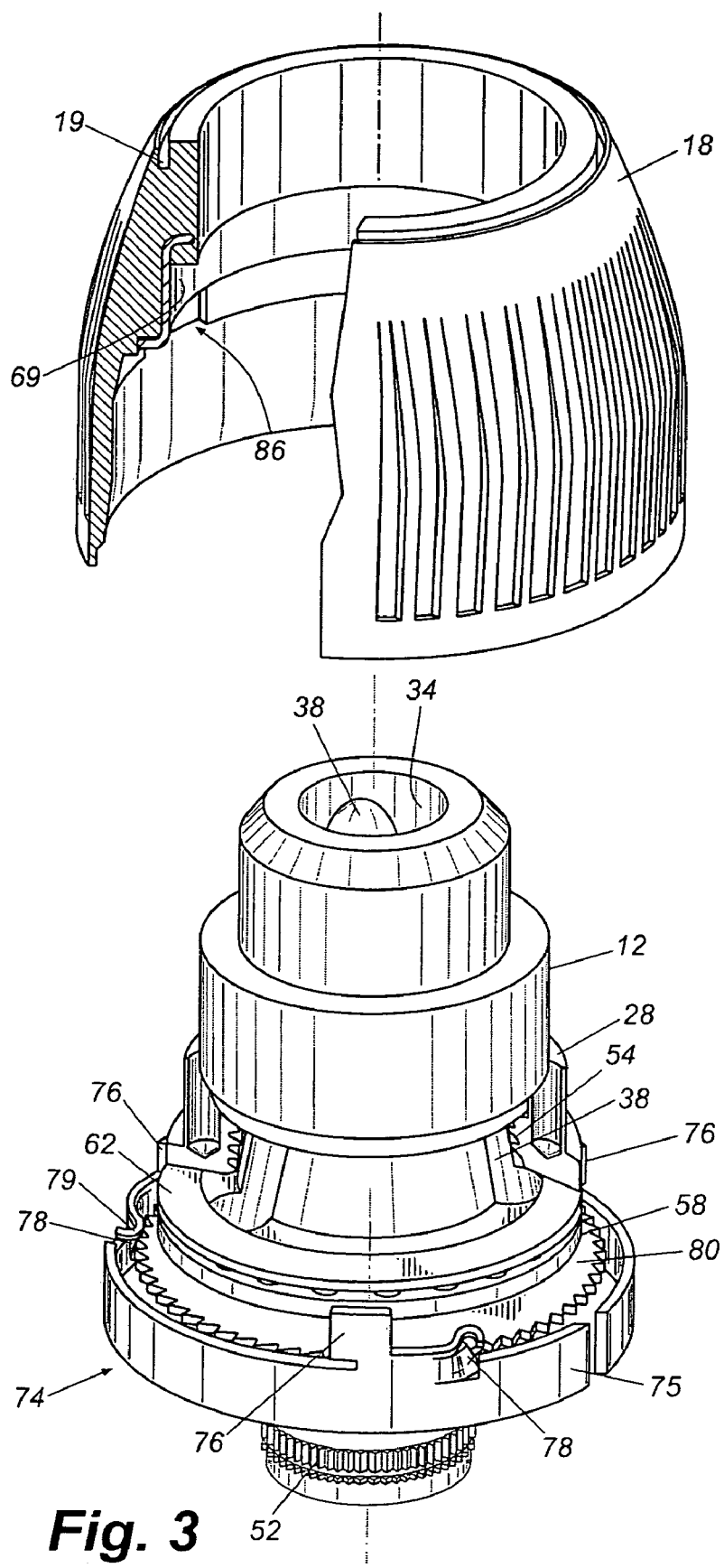
FIG. 3 is a partially exploded, top perspective view of the chuck shown in FIG. 1.

Referring to FIGS. 1 through 3, a chuck 10 in accordance with the present disclosure includes a body 12, a gripping mechanism, generally 14, a front sleeve 18, a nose piece 20, a rear sleeve 24 and a nut 28. In the embodiment illustrated, gripping mechanism 14 includes a plurality of jaws 26. Body 12 is generally cylindrical in shape and comprises a nose or forward section 30 and a tail or rearward section 32. An axial bore 34 formed in forward section 30 is dimensioned somewhat larger than the largest tool shank that chuck 10 is designed to accommodate. A threaded bore 36 (FIG. 2) is formed in tail section 32 and is of a standard size to mate with a drive shaft of a powered or hand driver, for example a power drill having a spindle. The bores 34 and 36 may communicate at a central region of body 12. While a threaded bore 36 is illustrated, such bore is interchangable with a tapered bore of a standard size to mate with a tapered drive shaft. Furthermore, body 12 may be formed integrally with the drive shaft.

Body 12 defines three passageways 38 that accommodate jaws 26. Each jaw is separated from each adjacent jaw by an arc of approximately 120 degrees. The axis of passageways 38 and jaws 26 are angled with respect to the chuck center axis 40 such that each passageway axis travels through axial bore 34 and intersects axis 40 at a common point. Each jaw 26 has a tool engaging face 42 generally parallel to chuck axis 40 and threads 44 formed on the opposite or outer surface of the jaw 26 that may be constructed in any suitable type and pitch.

Body 12 includes a thrust ring member 46 which, in a preferred embodiment, may be integral with body 12. In an alternate embodiment, thrust ring member 46 may be a separate component from body 12 that is axially and rotationally fixed to the chuck body by interlocking tabs, press fitting or other suitable connection means. Thrust ring member 46 includes a plurality of jaw guideways 48 formed around its circumference to permit retraction of jaws 26 therethrough and also includes a ledge portion 50 to receive a bearing assembly as described below.

Body tail section 32 includes a knurled surface 52 that receives rear sleeve 24 in a press fit fashion. Rear sleeve 24 could also be retained through a press fit without knurling, by use of a key or by crimping, staking, riveting, threading or any other suitable method of securing the sleeve to the body. Further, the chuck may be constructed with a single sleeve having no rear sleeve, for example where the power driver to which the chuck is attached includes a spindle lock feature to enable actuation of the chuck by the single sleeve when the spindle is rotationally fixed by the spindle lock.

Nut 28, which in the preferred embodiment is a split nut, defines female threads 54 located on an inner circumference of the nut and is received in a groove 56 formed in chuck body 12 proximate thrust ring member 46. A bearing washer 62 and an annular bearing cage 58 are received between thrust ring 46 and nut 28. Bearing cage 58 holds a plurality of balls 60 that permits the nut to rotate relative to the chuck body.

Nut 28 is shown in FIG. 1 without serrations or knurling on its outer circumference. However, it should be understood that nut 28 may be formed with axially-aligned teeth, or other forms of knurling, on its outer circumference, and its outer edges may be provided with a small chamfer 66 to facilitate press fitting of the nut into a bore 68 of front sleeve 18. Preferably, the front sleeve is molded or otherwise fabricated from a structural plastic such as a polycarbonate, a filled polypropylene, e.g., glass-filled polypropylene, or a blend of structural plastic materials. Other composite materials such as graphite filled polymerics may also be suitable in certain environments. As should be appreciated by one skilled in the art, the materials from which the chuck of the present disclosure are fabricated will depend on the end use of the chuck, and the above materials are provided by way of example only.

As best seen in FIG. 2, front sleeve 18 includes an annular band 69 molded therein such that annular band 69 surrounds nut 28. When nut 28 is without serrations or knurling on its outer circumference, as shown, annular band 69 is preferably molded into front sleeve 18 such that annular band 69 directly abuts nut 28. However, when nut 28 does include serrations or knurling, annular band 69 can be molded into front sleeve 18 such that some of the material from which front sleeve 18 is constructed is present between nut 28 and annular band 69. As such, the serrations and/or knurling on the nut can directly engage the material to help insure front sleeve 18 is non-rotatably secured to nut 28.

The outer circumferential surface of front sleeve 18 may be knurled or may be provided with longitudinal ribs 70 or other protrusions to enable the operator to grip the front sleeve securely. In like manner, the circumferential surface of rear sleeve 24 may be knurled or ribbed as at 72 if desired. Front sleeve 18 is press fit to nut 28 to rotationally and axially secure the sleeve to the nut. The press fitting of nose piece 20 to body nose section 30 also helps to retain sleeve 18 against forward axial movement. Nose piece 20 may be coated with a non-ferrous metallic coating to prevent rust and to enhance its appearance. Examples of suitable coatings include zinc or nickel, although it should be appreciated that any suitable coating could be utilized.

The press fitting of nose piece 20 to body nose section 30 also axially secures a shield cap 71 to the body of chuck 10. Shield cap 71 is substantially frustoconical in shape and includes an inwardly depending ledge 73a and a rearwardly depending annular ledge 73b. Inwardly depending ledge 73a is rotatably received in a gap formed between nose piece 20 and a forwardly facing ledge on body 10. Shield cap 71 extends axially rearwardly over at least a portion of front sleeve 18. As shown, front sleeve 18 preferably includes a forwardly depending annular groove 19 that rotatably receives annular ledge 73b of shield cap 71. Shield cap 71 is roatable with respect to both body 10 and front sleeve 18 such that contact of shield cap 71 with stationary objects during operation of the drill helps prevent over-tightening or loosening of the chuck on a tool shank.

Because sleeve 18 is rotationally fixed to nut 28, the rotation of sleeve 18 with respect to body 12 also rotates nut 28 with respect to the body, thereby moving jaws 26 axially within passageways 38 due to the engagement of jaw threads 44 and nut threads 54. The direction of axial movement of jaws 26 depends on the rotational direction of sleeve 18 and nut 28 with respect to body 12. If a tool, such as a drill bit, is inserted into bore 34, the sleeve and nut may be rotated about chuck axis 40 in a closing direction 88 (FIG. 5A) so that jaws 26 move to a closed position wherein jaw tool engaging surfaces 42 grippingly engage the tool. Rotation of sleeve 18 and nut 28 about axis 40 in the opposite or opening direction 90 (FIG. 5B) moves the jaws axially rearward out of the closed position to an open position as illustrated in FIG. 2.

Chuck 10 includes a tightening indicator comprising a pawl ring 74 and a ratchet ring 80. Pawl ring 74 includes an annular band 75 and tabs 78 that depend radially inwardly therefrom and into engagement with annular ratchet ring 80. Pawl ring 74 also defines axially forward extending drive tabs 76 formed on a leading edge of annular band 75. Ratchet ring 80 defines a plurality of teeth 83 formed on the ring's peripheral, circular edge. Each tooth 83 has a first side 84 (FIG. 4) with a slope approaching 90 degrees and a second side 85 having a lesser slope, which allows tabs 78 to slip over the teeth in the chuck's closing direction but not in the opposite, opening direction. Positioning elements 79 disposed adjacent to respective tabs 78 abut the front surface of ratchet ring 80 and thereby insure that the tabs 78 are maintained in the desired position such that they engage teeth 83.

Ratchet ring 80 is received on chuck body 12 intermediate annular bearing cage 58 and thrust ring 46. Pawl ring 74 is received about ratchet ring 80 and nut 28 so that grooves 86 (FIGS. 5A and 5B) formed on the inner circumference of front sleeve 18 receive respective drive tabs 76. The width of grooves 86 is larger than the width of respective drive tabs 76 so that sleeve 18 is rotatable over a limited angular distance relative to pawl ring 74.

Figure 4:
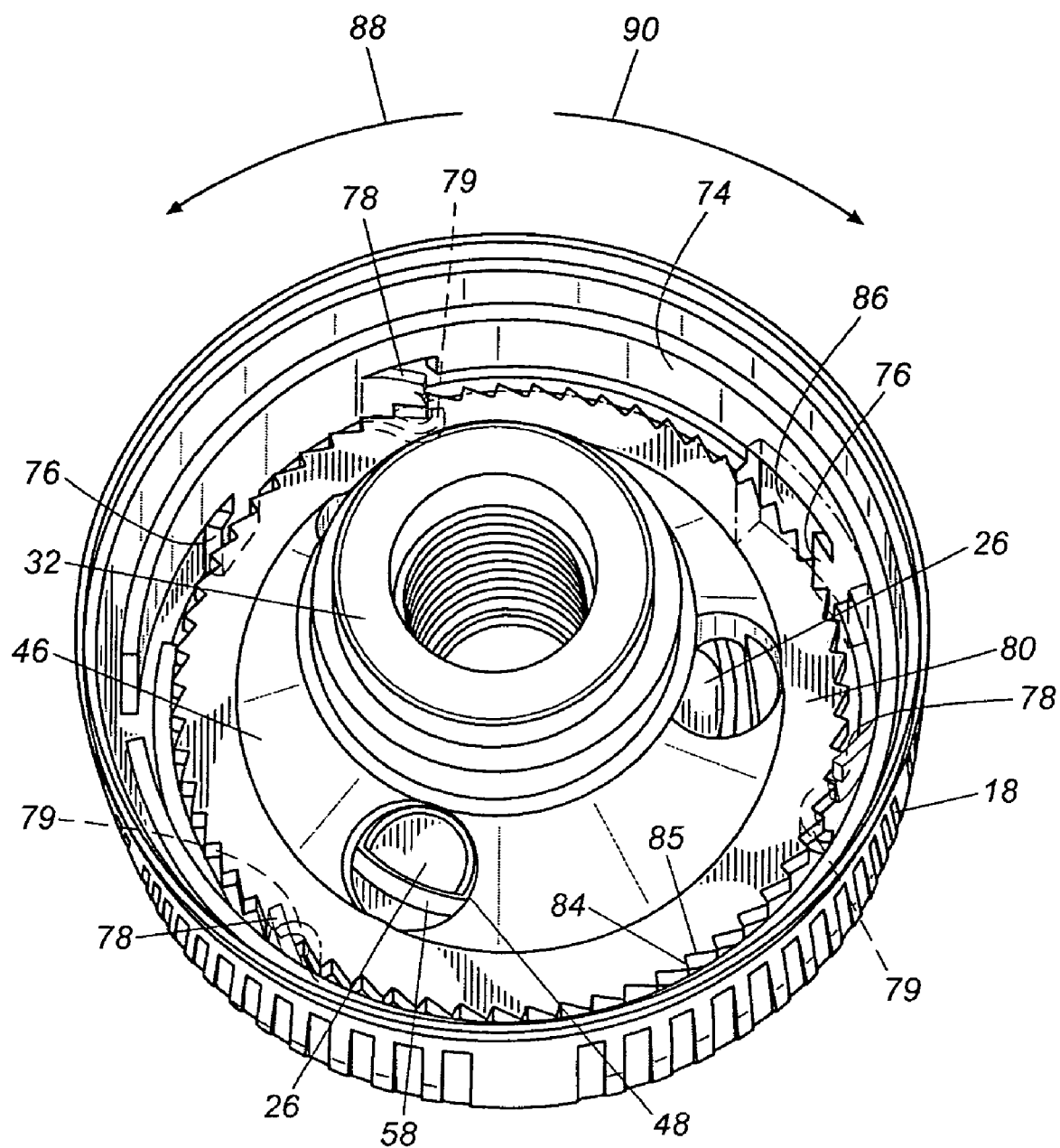
FIG. 4 is a bottom perspective view of the chuck shown in FIG. 1 with the rear sleeve removed.
Figure 5A:
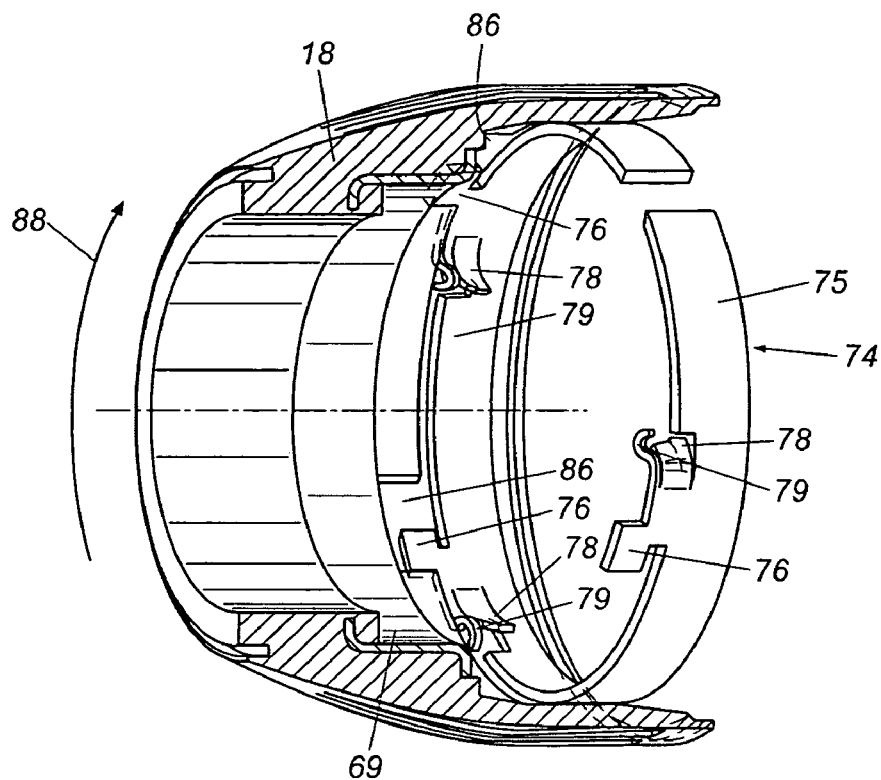
FIG. 5A is a partial cut-away, perspective view of the chuck sleeve as shown in FIG. 1, with the sleeve in a closing disposition.
Figure 5B:
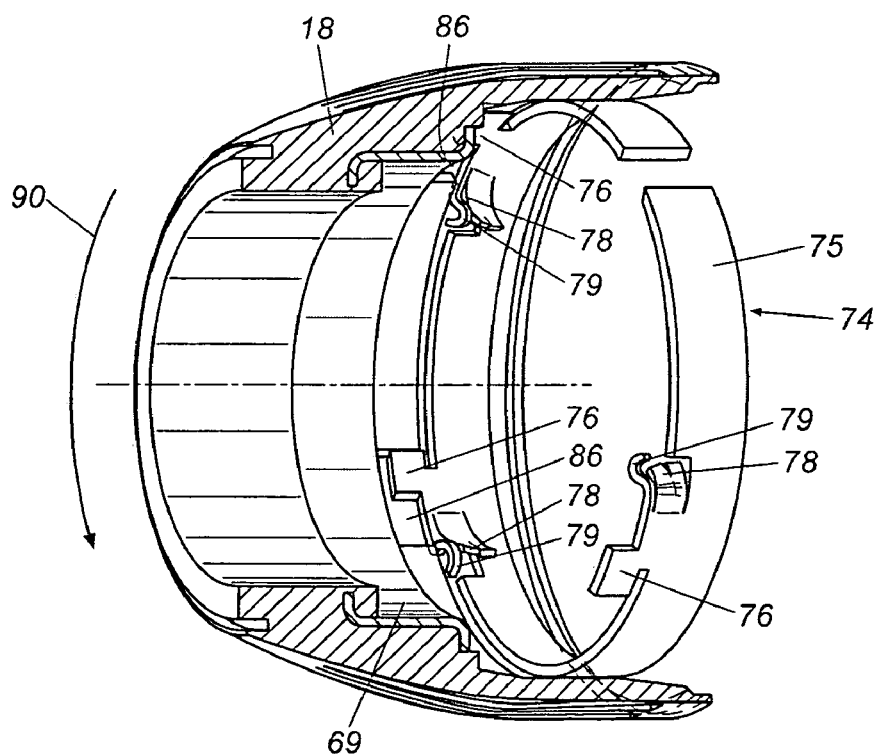
FIG. 5B is a partial cut-away, perspective view of the chuck sleeve as shown in FIG. 1, with the sleeve in an opening disposition.

Referring to FIGS. 4, 5A and 5B, to close the chuck from an open condition, nut 28 is rotated via front sleeve 18 in closing direction 88 (FIG. 5A) so that jaws 26 are threadedly moved axially forward within passageways 38. Because drive tabs 76 sit against the edges of grooves 86, pawl ring 74 rotates in conjunction with front sleeve 18. Ratchet ring 80 also rotates with front sleeve 18 since tabs 78 rotationally fix pawl ring 74 to ratchet ring 80. Once jaws 26 clamp onto a tool shank, however, a corresponding axial force is increasingly exerted rearwardly through jaws 26 and nut 28 to chuck body 12, and in particular against thrust ring member 46. Because ratchet ring 80 is intermediate annular bearing cage 58 and thrust ring ledge 50, axial force is transmitted from nut 28 to thrust ring member 46 through ratchet ring 80. This increases frictional forces between ratchet ring 80 and thrust ring member 46, in a direction opposite to the direction that front sleeve 18 and nut 28 are being rotated, to the point such frictional forces restrain rotation of ratchet ring 80 with respect to body member 16. Bearing cage 58, however, permits front sleeve 18 and nut 28 to continue to rotate relative to both chuck body 12 and ratchet ring 80 in closing direction 88.

Tabs 78 are deflectable and are generally disposed in alignment with the shallow slopes of the second side 85 of teeth 83 so that pawl ring 74 may continue to rotate with front sleeve 18 relative to ratchet ring 80. Thus, as pawl ring 74 rotates, tabs 78 repeatedly ride over teeth 83, producing an audible clicking sound as the tabs fall against the second side of each subsequent tooth. Tabs 78 are generally perpendicular to first sides 84 of teeth 83 and, therefore, do not deflect to permit rotation of pawl ring 74 in an opposite, opening direction 90. In short, until the jaws clamp onto a tool shank, ratchet ring 80 rotates with pawl ring 74. Once the jaws clamp onto a tool shank, and ratchet ring 80 becomes fixed relative to the chuck body, pawl ring 74 rotates in the closing direction relative to the ratchet ring but is blocked from rotating in opening direction 90.

In another embodiment the teeth 83 and tabs 78 can be constructed so that the first such audible indicator occurs when the user applies gripping torque through the sleeve to the jaws to the tool that is sufficient to secure the tool in the chuck for expected normal operation without slipping of the tool in the jaws. Thus, the first clicking sound following the jaws' engagement of the tool notifies the user that the desired tightening torque has been achieved and that the user may therefore stop continued tightening of the chuck. Of course, the level of desired gripping torque might vary amount different circumstances. Once the desired grip torque is defined, however, the degree to which the sleeve should be rotated to achieve the desired grip torque, and therefore the construction of the tabs 78 and teeth 83 needed to provide the first audible click as the user applies torque at the desired grip torque, depends upon the chuck's design and construction.

To open chuck 10, and referring particularly to FIG. 5B, front sleeve 18, and therefore nut 28, are rotated in direction 90 opposite to direction 88. Because tabs 78 and ratchet teeth 83 constrain pawl ring 74 in the opening direction, pawl ring 74 initially does not move, and drive tabs 76 therefore move through grooves 86 as sleeve 18 rotates. This slight rotation of nut 28 relative to chuck body 12 causes jaws 26 to retract slightly in passageways 38 and thereby release the axially rearward force that frictionally retains ratchet ring 80 between annular bearing cage 58 and thrust ring member 46. As a result, ratchet ring 80 is once again rotatable with respect to the body. As the user continues to rotate front sleeve 18 in opening direction 90, drive tabs 76 abut the sides of grooves 86 so that front sleeve 18 again drives pawl ring 74 and ratchet ring 80.

Depending on the frictional engagement between front sleeve 18 and click ring 74, if front sleeve 18 is thereafter rotated in the closing direction, drive tabs 76 may rotate through grooves 86 until the tabs abut the opposite sides of the grooves, and the chuck may then be operated in the closing direction as described above. In the presently illustrated embodiment, however, friction between front sleeve 18 and pawl ring 74 hold the sleeve and the ring together in the position shown in FIG. 5B as the sleeve is rotated in closing direction 88 (FIG. 5A) until the jaws close onto a tool shank. When this event stops rotation of ratchet ring 80, tabs 78 fix pawl ring 74 to ratchet ring 80 until grooves 86 in the still-rotating front sleeve 18 pass over drive tabs 76. When the following edges of grooves 86 engage drive tabs 76 (FIG. 5A), the sleeve again drives pawl ring 74, and the chuck operates as discussed above.

Note, chuck 10 as shown in FIGS. 1-5B could be modified to omit rear sleeve 24. Chucks having a single sleeve, in this case only a front sleeve, are generally used with drivers having a spindle lock so that the spindle can be rotationally fixed to the driver while the sleeve is rotated in the opening or closing direction. Spindle locks should be well understood in the art and are therefore not discussed in further detail herein. It should be understood, however, that a chuck 10 similar to that previously discussed, but having a single sleeve, would generally be used with a power driver having a spindle lock.

While one or more preferred embodiments of the drive chuck are described above, it should be appreciated by those skilled in the art that various modifications and variations can be made in the present drill chuck without departing from the scope and spirit thereof. For example, the ratchet ring can be secured to the sleeve and the click ring can be disposed intermediate the bearing ring and the thrust ring. It is intended that the present disclosure cover such modifications and variations as come within the scope and spirit of the appended claims and their equivalents.

What is claimed is:

1. A chuck for rotatably securing a tool with a shank to a manual or powered driver having a drive shaft, said chuck comprising:

a. a generally cylindrical body having a nose section and a tail section, said tail section being configured to receive the drive shaft of the driver and said nose section having an axial bore formed therein;

b. a plurality of jaws movably disposed with respect to said body in communication with said axial bore;

c. a nut rotatably mounted about said body and in driving engagement with said jaws so that rotation of said nut in a closing direction moves said jaws toward an axis of said axial bore and rotation of said nut in an opening direction moves said jaws away from said axis;

d. a generally cylindrical sleeve non-rotatably coupled to said nut;

e. a shield cap rotatably secured about said nose section of said body;

f. a first ring, and g. a second ring that rotates relative to said nut over a limited arc, wherein one of said first ring and said second ring defines a ratchet and the other of said first ring and said second ring defines at least one deflectable tab that is biased toward and engages said ratchet.

2. The chuck of claim 1, wherein:

when said chuck is in a first state said first ring and said second ring are rotationally coupled to each other in both said opening and said closing directions, and when said chuck is in a second state in which said jaws clamp onto the shank of the tool said second ring is rotatable relative to said first ring in at least said closing direction causing an audible click.

3. The chuck of claim 2, said ratchet further comprising a plurality of teeth formed on said first ring.

4. The chuck of claim 3, wherein said first ring further comprises a planar washer including an outer periphery, said plurality of teeth being formed on said outer periphery.

5. The chuck of claim 2, wherein said nut is rotatable with respect to said second ring over a limited distance in said opening direction so that said jaws unclamp from the tool shank, placing said chuck in said first state whereby said first ring is rotationally coupled to said second ring.

6. The chuck of claim 1, wherein said shield cap extends axially rearwardly over a front portion of said sleeve.

7. The chuck of claim 6, further comprising a nose piece non-rotatably secured to said nose section of said body, said nose piece being configured to rotatably secure said shield cap to said body.

8. The chuck of claim 7, said shield cap further comprising an inwardly depending ledge, said inwardly depending ledge being rotatably secured intermediate said nose piece and said nose section of said body.

9. The chuck of claim 7, said sleeve including a forwardly facing annular groove, said shield cap including a rearwardly depending annular ledge, wherein said annular ledge extends into said annular groove.

10. The chuck of claim 1, wherein said sleeve further comprises an annular band disposed adjacent said nut.

11. The chuck of claim 10, wherein said annular band is constructed of a metal.

12. A chuck for securing a tool with a shank to a manual or powered driver having a drive shaft, said chuck comprising:

a. a generally cylindrical body having a nose section and a tail section, said tail section being configured to rotate with the drive shaft of the driver and said nose section having an axial bore formed therein;

b. a plurality of jaws movably disposed with respect to said body in communication with said axial bore, said jaws defining a tool engaging surface on one side thereof and a first plurality of threads on an opposite side;

c. a nut rotationally mounted on said body and defining a plurality of threads on an inner circumference thereof, said nut being in threaded engagement with said jaws such that rotation of said nut causes said jaws to move with respect to said body;

d. a generally cylindrical sleeve rotatably mounted about said body and in driving engagement with said nut so that rotation of said sleeve in a closing direction moves said jaws toward said axial bore and rotation of said sleeve in an opening direction moves said jaws away from said axial bore;

e. a planar first ring defining a plurality of teeth formed thereon; and f. a second ring that is rotatable relative to said nut over a limited arc and that defines at least one pawl thereon, said at least one pawl being biased toward said first ring of teeth so that, when said chuck is in a first state, said planar first ring and said second ring are rotationally coupled to each other in both said opening and closing directions such that said first ring and said second ring are rotatable about said body, and when said chuck is in a second state in which said jaws clamp onto the shank of the tool, said second ring is rotatable relative to said planar first ring in said closing direction causing an audible click but is non-rotatable relative to said planar first ring in said opening direction.

13. The chuck of claim 12, wherein said body further includes a thrust ring and said first planar ring is disposed intermediate said nut and said thrust ring.

14. The chuck of claim 13, further comprising a bearing assembly disposed intermediate said nut and said planar first ring.

15. The chuck of claim 12, further comprising a shield cap rotatably secured to said nose section of said body.

16. The chuck of claim 15, wherein said shield cap extends rearwardly over a portion of said sleeve.

17. The chuck of claim 16, said sleeve including a forwardly facing annular groove, said shield cap including a rearwardly depending annular ledge, wherein said annular ledge extends into said annular groove.

18. The chuck of claim 16, further comprising a nose piece non-rotatably secured to said nose section of said body, said shield cap further comprising an inwardly depending ledge, said inwardly depending ledge being rotatably secured intermediate said nose piece and said nose section of said body.

19. The chuck of claim 12, said sleeve including an annular band disposed about said nut.

20. A chuck for use with a manual or powered driver having a drive shaft, said chuck comprising:

a. a generally cylindrical body having a nose section and a tail section, said tail section being configured to rotate with the drive shaft of the driver and said nose section having an axial bore formed therein;

b. a plurality of jaws movably disposed with respect to said body in communication with said axial bore;

c. a nut rotatably mounted about said body and in driving engagement with said jaws so that rotation of said nut in a closing direction moves said jaws toward an axis of said axial bore and rotation of said nut in an opening direction moves said jaws away from said axis;

d. a sleeve non-rotatably coupled to said nut, said sleeve including an annular band molded therein such that said annular band is adjacent said nut;

e. a first ring disposed adjacent said body, and f. a second ring that rotates relative to said nut over a limited arc, wherein one of said first ring and said second ring defines a ratchet and the other of said first ring and said second ring defines at least one deflectable pawl that is biased toward and engaging said ratchet, wherein when said chuck is in a first state said first ring and said second ring are rotationally coupled to each other in both said opening and said closing directions, and when said chuck is in a second state in which said jaws clamp onto a shank of a tool said second ring is rotatable relative to said first ring in at least said closing direction causing an audible click.

21. The chuck of claim 20, said ratchet further comprising a plurality of teeth.

22. The chuck of claim 20, wherein said nut is rotatable with respect to said second ring over a limited distance in said opening direction so that said jaws unclamp from the tool shank placing said chuck in said first state whereby said first ring is rotationally coupled to said second ring.

23. A chuck for use with a manual or powered driver having a drive shaft, said chuck comprising:
 a. a generally cylindrical body having a nose section and a tail section, said tail section being configured to rotate with the drive shaft of the driver and said nose section having an axial bore formed therein;
 b. a plurality of jaws movably disposed with respect to said body in communication with said axial bore;
 c. a nut rotatably mounted about said body and in operative communication with said jaws so that rotation of said nut in a closing direction moves said jaws toward an axis of said axial bore and rotation of said nut in an opening direction moves said jaws away from said axis;
 d. a generally cylindrical sleeve rotatably mounted about said body and in driving engagement with said nut;
 e. a first ring disposed adjacent said body, said first ring including a plurality of equally spaced teeth, said first ring traveling with one of said nut and said body; and
 f. a second ring including at least one deflectable tab that travels with the other of said nut and said body, said at least one deflectable tab being biased toward and continuously received in one of said plurality of equally spaced teeth,
 wherein movement of said at least one deflectable pawl from said one of said plurality of equally spaced teeth to an adjacent one of said plurality of equally spaced teeth corresponds to a predetermined input torque on said nut that results in a predetermined output gripping force between said plurality of jaws.

24. The chuck of claim 23, wherein when said at least one deflectable tab moves from said one of said plurality of equally spaced teeth to said adjacent one of said plurality of equally spaced teeth, an audible click is generated to indicate to a user that said predetermined input torque has been achieved on said nut.

* * * * *